March 30, 1926.

R. E. GILMAN 1,578,510

TURBO VENTILATION

Filed Oct. 5, 1923

WITNESSES:
A.J.Schiefelbein
O.B.Buchanan

INVENTOR
Ralph E. Gilman.
BY
Wesley G. Carr
ATTORNEY

Patented Mar. 30, 1926.

1,578,510

UNITED STATES PATENT OFFICE.

RALPH E. GILMAN, OF PITTSBURGH, PENNSYLVANIA, ASSIGNOR TO WESTINGHOUSE ELECTRIC & MANUFACTURING COMPANY, A CORPORATION OF PENNSYLVANIA.

TURBO VENTILATION.

Application filed October 5, 1923. Serial No. 666,699.

*To all whom it may concern:*

Be it known that I, RALPH E. GILMAN, a citizen of the United States, and a resident of Pittsburgh, in the county of Allegheny and State of Pennsylvania, have invented a new and useful Improvement in Turbo Ventilation, of which the following is a specification.

My invention relates to the ventilation of dynamo-electric machines and it has particular relation to the type of machine which is ventilated by means of air admitted to the periphery of the stator as well as air admitted to the ends of the air-gap, the ventilation being secured by a circulation radially through ventilating ducts in the stator and axially through the air-gap.

Another object of my invention is to provide some means for producing a baffle ring in the air gap for controlling or equalizing the distribution of radial air velocities in the stator ventilating ducts of machines of the type just described.

My invention is an improvement of the type of apparatus described generically in a copending application, Serial No. 647,779, filed June 26, 1923, by Donald Bratt and Carl J. Fechheimer, and assigned to the Westinghouse Electric and Manufacturing Company.

In said copending application, approximately equal radial air velocities in the stator member were secured solely by the proper choice of the numbers and cross-sectional areas of the several radial ventilating spaces and the dimensions of the air gap, but the prior applicants did not realize the importance of, or at least the means for, causing the radial velocities to be symmetrically distributed with respect to the center-lines of the respective groups. It is not always possible to secure the desired results by such means, particularly in the end groups of radial ventilating spaces, since the balance point in said end groups is usually displaced too far toward the inner end of said groups. According to my invention, therefore, I provide baffle rings in the air gap for producing an artificial balance point, or for otherwise controlling the distribution of the air in the radial ventilating spaces of the stator, whereby the radial velocities in any group of stator intake or discharge passages are substantially symmetrical with respect to the center-line of the group.

With the foregoing and other objects in view, my invention consists in the construction and arrangement hereinafter described and claimed, and illustrated in the accompanying drawing, wherein—

Figure 1:
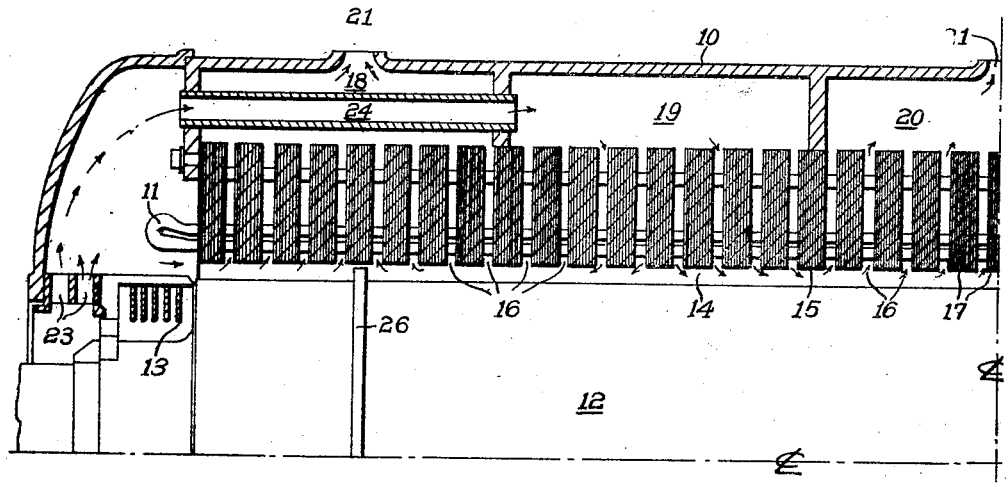
Figure 2:
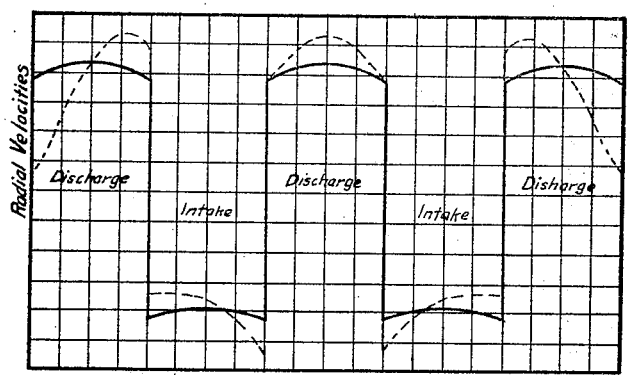

Figure 1 is a longitudinal sectional view illustrating a turbo-alternator embodying my invention, and Fig. 2 is a curve drawing illustrating the principles of application of my invention.

In Fig. 1 is shown a turbo-alternator comprising a stator member 10, carrying alternating-current windings 11, and a rotor member 12, carrying direct-current field windings, the end turns of which are shown at 13. The stator and rotor members are both of the smooth-core type, and they are separated by an air-gap 14.

The stator member 10 comprises a laminated magnetizable core 15 having a large number of radial ventilating spaces 16 left between bunches of laminations 17. The radial ventilating spaces or ducts are divided into a plurality of groups surrounded by annular chambers 18, 19 and 20, the central and end chambers 20 and 18 being discharge chambers having discharge vents 21, and the intermediate chamber 19 being an intake chamber for forcing a cooling fluid radially inwardly through the corresponding radial spaces 16.

Cooling fluid is supplied to the end bells of the machine by any suitable means, such as fans 23 which are secured to the ends of the rotor member 12. The intake chambers 19 are likewise supplied with cooling fluid by any suitable means, such as ducts 24 connecting the same to the respective end-ball spaces.

The general operation of the ventilating system shown in Fig. 1 will be obvious. Cooling fluid admitted from the ends of the air-gap passes out through the nearest radial ducts 16 into the annular discharge chambers 18. Cooling fluid admitted from the annular intake chambers 19 passes radially inwardly to the air-gap and thence divides and discharges through the radial ducts 16 associated with the adjacent annular discharge chambers 18 and 20, all as indicated by the arrows.

The function of cooling is performed mainly by the radially moving air in the radial ventilating spaces rather than by the axially moving air in the air-gap, and prior structures of the type hereinabove described have been subject to the objection that the air admitted from the ends of the air-gap travels at such a high initial velocity that it does not have a sufficient pressure-head to cause a sufficient radial flow in the first few radial ventilating spaces of the stator member. Furthermore, the air admitted from the ends of the air-gap disturbs the balance or symmetry of the radial-velocity distribution in all of the sections except the center section and it very greatly increases the differences between the maximum and minimum radial velocities in the several groups of intake and discharge spaces. The balance or symmetry just spoken of is the similarity of the velocity curve on opposite sides of the center-line of each section in question. A typical curve illustrating the conditions in machines of the type known in the prior art is indicated in dotted lines in Fig. 2, wherein the radial velocities are plotted against the length of the air-gap.

Since the principal cooling function is performed by the radially moving air, and since such cooling is dependent upon the velocity of the air, it is apparently desirable to maintain, as far as possible, balanced or symmetrical conditions in each of the sections or groups of radial ventilating spaces of the stator member. I have found that the poor radial-velocity distribution which is shown in dotted lines in Fig. 2 can be improved by means of suitable baffle rings in the air-gap.

According to my invention, therefore, I provide baffle rings 26 disposed about the rotor member and projecting into the air gap. Such baffle rings may be provided by means of groups of rotor laminations of greater diameter than the other laminations, or by means of annular rings of suitable material such as bakelite micarta.

In the form of my invention as shown, by way of example, in Fig. 1, the baffle ring 26 is disposed on the central line of the first section of the stator member to provide, in effect, a closure in the air-gap at such point.

In a ventilating system designed in accordance with my invention, the so-called "stator" ventilation, resulting from the air admitted to the annular intake chambers of the stator, may be laid out symmetrically with a view to obtaining a substantially balanced or symmetrical distribution of the radial velocities with respect to the centers of each group of radial intake or discharge passages. The baffle ring is then placed at the ends of the half-sections comprising the end discharge radial vents of the "stator" ventilation. The so-called "air-gap" ventilation, utilizing air blown in from the ends of the air-gap, may then have as many, or as few, radial vents in the stator as may be necessary or desirable, and the main or "stator" ventilation will not be disturbed.

In the embodiment of my invention illustrated in Fig. 1, the end half-section of the stator member is shown as having the same length as the last half-section of the discharge for the "stator" ventilation, and the resultant distribution of radial velocity will be somewhat as shown in full lines in Fig. 2. It will be seen that the result of this arrangement is that all groups have approximately the same minimum radial velocities, and approximately the same maximum radial velocities, of the cooling fluid.

While I have shown my baffle rings as being disposed at the balance points of the end sections, that is, at the points of maximum radial velocities in the radial ventilating spaces, it is, of course, obvious that baffle rings of various thicknesses may be disposed at other points in the air gap, particularly at points closer to the end bells of the machine, for increasing the radial flow in the terminal radial spaces of the stator member. Furthermore, while I have shown baffle rings as mounted upon the rotor member, it is obvious that such rings may also be mounted on the stator member. I desire, therefore, that the appended claims shall be given the broadest interpretation consistent with the prior art.

I claim as my invention:

1. A dynamo-electric machine comprising a stator member and a rotor member separated by an air-gap, said stator member being provided with a plurality of radial ventilating spaces surrounding said air-gap, means for introducing a ventilating fluid and causing the same to move radially inwardly in certain radial spaces, radially outwardly in others and axially in the air-gap, and baffle means disposed within said air-gap for equalizing the distribution of radial velocities of the ventilating fluid.

2. A dynamo-electric machine comprising a stator member and a rotor member separated by an air-gap, said stator member being provided with a plurality of radial ventilating spaces surrounding said air-gap, stator ventilation means for introducing a ventilating fluid to the periphery of the stator member and for causing said ventilating fluid to move radially inwardly in certain radial spaces, radially outwardly in others and axially in the air-gap, said means being arranged for substantially balanced or symmetrical distribution of radial velocities in each of the intermediate groups of intake and discharge radial ventilating spaces and in the inner portion of the end groups of discharge radial ventilating spaces, air-gap ventilation means for introducing a ventilating fluid to the ends of the air-gap, said fluid passing outwardly through the adjacent radial spaces, and a plurality of baffle rings disposed on said rotor member within said air-gap and near the ends thereof for substantially preventing the ventilating fluid admitted from the ends of the air-gap from disturbing said balanced stator ventilation.

3. A dynamo-electric machine comprising a stator member and a rotor member separated by an air-gap, said stator member being provided with a plurality of radial ventilating spaces surrounding said air-gap, a common means for introducing a ventilating fluid to a plurality of annular regions around the stator member and to the ends of the air-gap and for causing said ventilating fluid to move radially inwardly in certain radial spaces, radially outwardly in others and axially in the air-gap, said means being arranged for substantially balanced or symmetrical distribution of radial velocities in each of the intermediate groups of intake and discharge radial ventilating spaces and in the inner portion of the end groups of discharge radial ventilating spaces, and a baffle ring disposed on said rotor member within said air-gap between the ends of each of said end groups of discharge radial ventilating spaces for substantially balancing the static pressures of the axially flowing ventilating fluids admitted, respectively, from the ends of the air-gap and from the periphery of the stator member, whereby said substantially balanced or symmetrical distribution of radial velocities is maintained.

4. A dynamo-electric machine having a rotor and a stator with an air-gap therebetween, said stator embodying a ventilating system comprising a plurality of groups of radially extending ventilating spaces surrounding the air-gap, intake chambers surrounding one or more groups of radial spaces for conducting a cooling fluid radially inwardly, discharge means surrounding the remaining groups of radial spaces, and a baffle member or members so disposed in the air-gap that all groups have substantially the same minimum radial velocities and the same maximum radial velocities of the cooling fluid.

5. A dynamo-electric machine having a rotor and a stator with an air-gap therebetween, said stator embodying a ventilating system comprising a plurality of groups of radially extending ventilating spaces surrounding the air-gap, intake chambers surrounding one or more groups of radial spaces for conducting a cooling fluid radially inwardly, discharge means surrounding the remaining groups of radial spaces, entrance chambers for cooling fluid at the two ends of the air gap, means for maintaining approximately the same pressures in said intake and entrance chambers, and means for providing, in effect, a baffle ring disposed in the air-gap under each of the end groups whereby approximately equal average radial velocities are obtained in all of the groups.

In testimony whereof, I have hereunto subscribed my name this 2nd day of October, 1923.

RALPH E. GILMAN.